(12) United States Patent
Awechter-Stehle et al.

(10) Patent No.: US 9,202,271 B2
(45) Date of Patent: Dec. 1, 2015

(54) METHOD FOR DETERMINING A PHYSICAL PROPERTY OF AN OBJECT, SYSTEM, COMPUTER READABLE MEDIUM AND PROGRAM ELEMENT

(75) Inventors: Irina Awechter-Stehle, Hamburg (DE); Reinhard Kneser, Aachen (DE); Juergen Weese, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 185 days.

(21) Appl. No.: 13/642,565

(22) PCT Filed: Apr. 18, 2011

(86) PCT No.: PCT/IB2011/051668
§ 371 (c)(1),
(2), (4) Date: Oct. 22, 2012

(87) PCT Pub. No.: WO2011/132131
PCT Pub. Date: Oct. 27, 2011

(65) Prior Publication Data
US 2013/0039554 A1 Feb. 14, 2013

(30) Foreign Application Priority Data
Apr. 21, 2010 (EP) .................................... 10160630

(51) Int. Cl.
*G06K 9/00* (2006.01)
*G06T 7/00* (2006.01)
*G06T 7/60* (2006.01)

(52) U.S. Cl.
CPC ............... *G06T 7/0012* (2013.01); *G06T 7/602* (2013.01); *G06T 2200/04* (2013.01); *G06T 2207/30101* (2013.01)

(58) Field of Classification Search
None
See application file for complete search history.

(56) References Cited

U.S. PATENT DOCUMENTS

| 6,718,193 | B2 * | 4/2004 | Knoplioch et al. ............ 600/407 |
| 6,975,973 | B1 * | 12/2005 | Bruijns ............................. 703/2 |
| 7,103,202 | B2 * | 9/2006 | Bruijns ......................... 382/128 |
| 2006/0165268 | A1 | 7/2006 | Kaus et al. |
| 2007/0197898 | A1 | 8/2007 | Bolle |
| 2007/0216678 | A1 * | 9/2007 | Rouet et al. .................... 345/423 |
| 2008/0303818 | A1 * | 12/2008 | Moriya .......................... 345/427 |

(Continued)

FOREIGN PATENT DOCUMENTS

WO 2004010382 A1 1/2004

OTHER PUBLICATIONS

Razvan et al ("Dynamic Model-driven quantitative and visual evaluation of the Aortic Valve from 4D CT", MICCAI, Part I, 2008, pp. 686-694).*

(Continued)

*Primary Examiner* — Amara Abdi (57) ABSTRACT

A method and a system for determining a physical property of an object, e.g., a diameter value of an anatomical structure, employs local object context information for determining a local physical property of the object. The context information may be a known or determined cross-sectional shape of the object. In one embodiment, a processor may be configured to provide volumetric image information of the object having a three-dimensional structure; determine the physical property of the object along its three-dimensional structure; determine the object context information of the object; and visualize the object context information and the physical property on a display.

15 Claims, 6 Drawing Sheets

(56) References Cited

U.S. PATENT DOCUMENTS

| | | | |
|---|---|---|---|
| 2009/0088632 A1* | 4/2009 | Khamene et al. | 600/424 |
| 2009/0136107 A1 | 5/2009 | Arnold et al. | |
| 2012/0014574 A1* | 1/2012 | Ferschel et al. | 382/128 |

OTHER PUBLICATIONS

Ecabert et el, "Automatic model-based segmentation of the heart in CT images", IEEE, Transactions on Medical Imaging, vol. 27, No. 9, pp. 1189-1201, 2008).*

P. Kohlmann et al., "Contextual Picking of Volumetric Structures", IEEE Pacific Visualization Symposium 2009, Apr. 20-23, Bejing, China.

J. Yao et al., "Employing Anatomical Knowledge in Vertebral Column", Proc. SPIE, vol. 7259, 7253Y (2009), Mar. 27, 2009.

P.J. Glynn et al., Proc. SPIE, vol. 7262, 726220 (2009), Feb. 27, 2009.

C.J. Schultz et al., Three Dimensional Evaluation of the Aortic Annulus Using Multislice Computer Tomography: Are, Dec. 7, 2009.

N. Piazza et al., "Anatomy of the Aortic Valvar Complex and Its Implications for Transcatheter Implantation of the Aortic Valuve", Circulation Cardiovascular Interventions, vol. 1, No. 1, Aug. 1, 2008, pp. 74-81.

J. Peters et al., "Segmentation of the Heart and Major Vascular Structures in Cardiovascular CT Images", Progress in Biomedical Optics and Imaging, SPIE—International Society for Optical Engineering, Bellingham, WA, US, vol. 6914, Mar. 11, 2008.

S.H. Ewe, et al., "Role of Computed Tomography Imaging for Transcatheter Valvular Repair/Insertion", The International Journal of Cardiovascular Imaging, Jan. 1, 2011.

Cribier et al, "Early Experience With Percutaneous Transcatheter Implantation of Heart Valve Prosthesis for the Treatment of End-Stage Inoperable Patients With Calcific Aortic Stenosis", Journal of the American College of Cardiology, vol. 43, No. 4, 2004, pp. 698-703.

Laurens et al, "Noninvasive Evaluation of the Aortic Root With Multislice Computed Tomography: Implications for Transcatheter Aortic Valve Replacement", Cardiovascular Imaging—Vol. 1(3), pp. 321-330, 2008.

Ecabert et al, "Automatic Model-Based Segmentation of the Heart in CT Images" IEEE Transactions on Medical Imaging, vol. 27, No. 9, pp. 1189-1201, 2008.

Ionasec et al, Dynamic Model-Driven Quantittive and Visual Evaluation of the Aortic Valve From 4D CT*, MICCAI, Part I, 2008, pp. 686-694.

* cited by examiner

METHOD FOR DETERMINING A PHYSICAL PROPERTY OF AN OBJECT, SYSTEM, COMPUTER READABLE MEDIUM AND PROGRAM ELEMENT

FIELD OF THE INVENTION

The present invention relates to a method and a system for medical image evaluation, in particular it relates to determining a physical property of an object.

BACKGROUND OF THE INVENTION

For preparing and planning medical procedures, it may be beneficial to determine a physical property, e.g. a length, diameter or dimension of an object, for example an anatomical structure, before beginning an actual operation.

E.g. in the case of minimally invasive surgery, for example for planning of a minimally invasive valve replacement procedure, different diameter values of a blood vessel, in particular the aorta along the aortic bulbus and its surrounding structures may be required. According measurements may be employed to subsequently determine a size of a suitable valve replacement element or stent.

Currently, desired physical properties may be determined manually, e.g. by medical personnel, employing pre-interventional medical image data, for example CT data. Such a manual determination however may result in a substantially non-repeatable measurement procedure, possibly obtaining diameter values, which are not well-defined or to some extent incorrect.

Thus, there may be a need for an improvement in the quality of a determination of a physical property, e.g. a diameter, of a vessel structure.

Document US 2007/0197898 A1 describes determining a vessel diameter by calculating the perpendicular distance between an inner wall of a vessel and a center path.

SUMMARY OF THE INVENTION

Accordingly, a method, a system, a computer-readable medium as well as a program element for determining a physical property of an object according to the independent claims is provided.

Preferred embodiments of the present invention may be derived from the dependent claims.

Vascular diseases may be treated minimally invasively, e.g. by a minimally invasive valve replacement, employing X-ray guidance. To achieve minimally invasive replacement of e.g. the aortic valve or the pulmonary valve, the artificial valve is mounted in a stent, which is positioned under X-ray guidance using a catheter.

When determining the size/diameter of an according stent, physical properties, e.g. a diameter of an anatomical structure relevant to the operation, may be determined when planning the operation, employing a pre-interventional medical image data set. Dedicated measurement planes within the volumetric image data may be employed for performing actual measurements in the planes regarding the physical property desired. However, if the orientation of a plane is not well-defined, i.e. suitably positioned, e.g. a cross-section of a tubular structure may be incorrectly displayed, i.e. deformed, possibly resulting in an incorrect measurement.

For example, a circular structure may be displayed elliptically in case the orientation of a measurement plane is not precisely set. On the other hand, the physical property, e.g. the diameter value itself, may not be precisely definable, as the structures of interest or anatomical structures are not always cylindrical.

E.g. the outflow tract of an aorta may be elliptical, the bulbus may be a rounded triangle and the ascending aorta may be substantially circular. Thus, diameter values, in particular a minimum and maximum diameter value to be measured, may be defined differently for differing anatomical structures. The diameter values and/or the shape of the anatomical structures may vary along the left ventricular outflow tract, bulbus and aorta requiring measurements to be performed at a correct position within a measurement plane, which is correctly aligned.

The gist of the invention may be seen as providing a method and a system for determining a physical property of an object, e.g. a diameter profile of the object along its three-dimensional structure, and subsequently analyzing and/or displaying the physical property within an object context, i.e. employing object context information. E.g., in case the object is an anatomical structure, an anatomical context of the anatomical structure may be employed for a preferred determination of the physical property. In other words, if the anatomical structure is a blood vessel, in particular a section of an aorta, individual anatomical structures may be assigned to individual segments of the object.

E.g. in case of the aorta, segments may comprise the left ventricular outflow tract, the aortic bulbus and the ascending aorta. The respective segments may have an individual, local anatomical structure. This anatomical context information may be employed for determining, e.g. calculating or computing, a local diameter property of the respective segments or anatomical structures, possibly employing a different determination method depending on the structure and its context information. E.g., with a segment or anatomical structure having an elliptically cross-section, an ellipsoid geometrical structure may be employed for a preferred approximation of the cross-section for determining a diameter property, e.g. a minimum and a maximum diameter value. In case the segment or anatomical structure comprises a circular cross-section, a circle may be employed for approximating a diameter value.

These and other aspects of the present invention will become apparent from and elucidated with reference to the embodiments described hereinafter.

Exemplary embodiments of the present invention will be described below with reference to the following drawings.

The illustration in the drawings is schematic. In different drawings, similar or identical elements are provided with similar or identical reference numerals.

The figures are not drawn to scale however may depict qualitative proportions.

DETAILED DESCRIPTION OF THE EMBODIMENTS

One aspect of the invention may be seen as providing a diameter profile along the anatomical structure, e.g. following its preferred elongated extension, while analyzing and/or displaying diameter values, e.g. a minimum, a mean and a maximum diameter value, taking into account both the anatomical structure and its respective cross-sectional shape for determining a preferred method for calculating the diameter values. The present invention employs volumetric image information of a three-dimensional image modality for determining a three-dimensional representation of an object or a region of interest of an object, e.g., a patient specific geometry of a left ventricle, an aortic bulbus and an ascending aorta of a patient. Such a three-dimensional representation may be obtained by employing a model-based segmentation of cardiac CT image information.

For model based segmentation, a generic three-dimensional model or a generic shape of an anatomic structure may be employed. An according shape model may be realized by employing a geometrical mesh-structure corresponding to a comparable generic anatomical structure. Within the generic model, individual anatomical segments may be defined corresponding to individual anatomical structures comprising individual object context information. The generic mesh-structure is adapted in its form to a patient specific geometry e.g. by employing volumetric medical image data. As a result, an adapted shape model substantially matching the anatomical structure of a patient is obtainable. During the adaptation, the generically encoded anatomical structures are possibly adapted as well, so defining and identifying the respective actual anatomical structure of the patient within the image data. An according segmentation may further be employed for evaluation physical properties of the patient structure, in particular defining measurement planes, within which measurement planes the relevant physical properties are determined.

Depending on the local structure of the object, e.g. its anatomical structure or type of anatomical structure, object context information, e.g. information about a specific cross-sectional embodiment of the respective object structure at a specific position, may be employed. Thus, depending on the structure or rather its object context information, a dedicated method may be chosen and employed for the determination of individual diameter values, e.g. minimum and maximum diameter values. For example, the left ventricular outflow tract may generally comprise an elliptical cross-section. Accordingly, the associated object context information, referring to the left ventricular outflow tract, may be considered as an indication about its shape as comprising an elliptical cross-section. Employing this object context information, an ellipsoid geometric structure may be fitted within the cross-section for determining minimum and maximum diameter values.

The bulbus may be considered as a rounded triangle, comprising according object context information. In accordance with the associated object context information, an inner and an outer circle may be fitted for determining diameter values. The ascending aorta may be considered to be substantially circular, thus employing as object context information, a circle or an ellipse may be fitted for determining diameter values.

In this particular embodiment, object context information may be considered as information regarding its geometry of its cross-section. However, it is to be understood that object context information may be any other object and/or location dependent information individual to a specific object or, at least its local properties. In particular, object context information may be understood as any pre-given or known, rather than readily obtained, information or knowledge about an object.

By determining individual diameter values along the three-dimensional structure of the object, a diameter profile may be determined. The diameter profile may be presented to medical personnel, e.g. by visualization on a monitor.

Different anatomical regions, segments or anatomical structures may be identified within the diameter profile, possibly employing dedicated landmarks. E.g., a landmark may be an accordingly oriented measurement plane comprising the aortic valve. The respective landmark and the associated measurement plane may be oriented accordingly, preferably logically connected, to the aortic valve plane within the volumetric image data.

Also, a landmark may be a defined structure or object within an anatomical structure. An according landmark within the volumetric image information may be determined during analyzing the image information and may be mapped, i.e. logically bound, to according landmarks within the shape model for further adaptation and optimization. One example of such a landmark are the leaflets of the aortic valve, which may be employed for determining the aortic valve plane.

For some measurement planes, a height or position on the three-dimensional structure may be determined by according landmarks, while for others the height or position may be determined by the diameter profile itself and the individual diameter values respectively. For example, the mid-sinusal plane may be positioned at the maximum diameter within the diameter profile, while the tubular junction plane may be positioned at the bending point between the mid-sinusal plane and the ascending aorta. As mentioned before, the aortic valve plane may be defined by a landmark as well.

The position of the measurement planes, which may be considered to be of clinical interest, may be computed from the diameter profile and be subsequently indicated within the diameter profile. The measurement planes may also be linked to the diameter profile. E.g., if a landmark is moved, for example the landmark relating to the aortic valve plane or the three aortic leaflets of the individual valve flaps, the associated measurement plane may be moved as well. An according linkage may ensure meaningful, well-defined and repeatable diameter measurements.

The object itself may comprise a plurality of segments with each segments comprising individual, local object context information. E.g., in case of the object being a blood vessel, in particular an aorta, the vessel may be divided into a plurality of segments with each segment having its own object context information. E.g. a left ventricular outflow tract may comprise as object context information the information that it exhibits an elliptical cross-sectional shape, while the aortic bulbus may comprise as object context information the information of a triangular cross-sectional shape and the segment of the ascending aorta may comprise as object context information the information to comprise a substantially circular shape. Information about the individual anatomical structure may also constitute object context information.

The respective local object context information may subsequently be employed for determining a local physical property. E.g. for the left ventricular outflow tract comprising an elliptical cross-sectional shape, a matching or fitting algorithm may be employed using an ellipsoid structure. Subsequently, the ellipsoid structure may be fitted into the elliptical shape of the vessel and the so fitted ellipsoid shape may be employed for determining a minimum and maximum diameter value of the blood vessel from the respective diameter values of the geometric structure employed, here the ellipsoid structure.

A segment comprising a triangular shape may employ two concentrically aligned circles, i.e. an inner and an outer circle, for determining the minimum and maximum diameter, while a segment comprising a circular shape may employ one of a circular structure or ellipsoid structure, substantially comprising an identical minimum and maximum diameter value.

The object may comprise an anatomical structure while the associated object context information comprises anatomical context information, e.g. the shape of a cross-section of the anatomical structure or the type of the anatomical structure.

Different views or measurement planes may be employed along the three-dimensional structure of the object for establishing a plurality of diameter properties, in particular minimum and maximum local diameter values. Such a plurality of diameter properties may be employed to subsequently obtain a diameter profile. A diameter profile may depict the determined individual diameter property values along the extension of the three-dimensional structure of the object, e.g. starting from the left ventricular outflow tract in the direction of the ascending aorta.

An individual position along the three-dimensional structure may be referred to as having a specific height compared to the starting point within the left ventricular outflow tract, substantially describing the distance travelled starting from the left ventricular outflow tract to the current local position along or on three-dimensional structure of the object.

The individual measurement planes may not be required to be substantially parallel but may be oriented in accordance with a specific anatomical structure.

E.g. regarding the aortic valve plane, a measurement plane may be employed substantially parallel or equaling the aortic valve plane for obtaining the diameter property values. In case no dedicated anatomical structure is present at a specific position along the three-dimensional structure of the object, the measurement plane may be aligned so that it is parallel to a further measurement plane.

In particular, the measurement planes may not be required to correspond to one plane of the medical volumetric image information, e.g. may not be required to correspond to one of the sagittal, coronal and transverse plane but may also be computed as an oblique plane. Now referring to FIG. 1a, a three-dimensional representation of a heart including an ascending aorta, an arch of the aorta and a descending aorta is depicted.

Figure 1A:
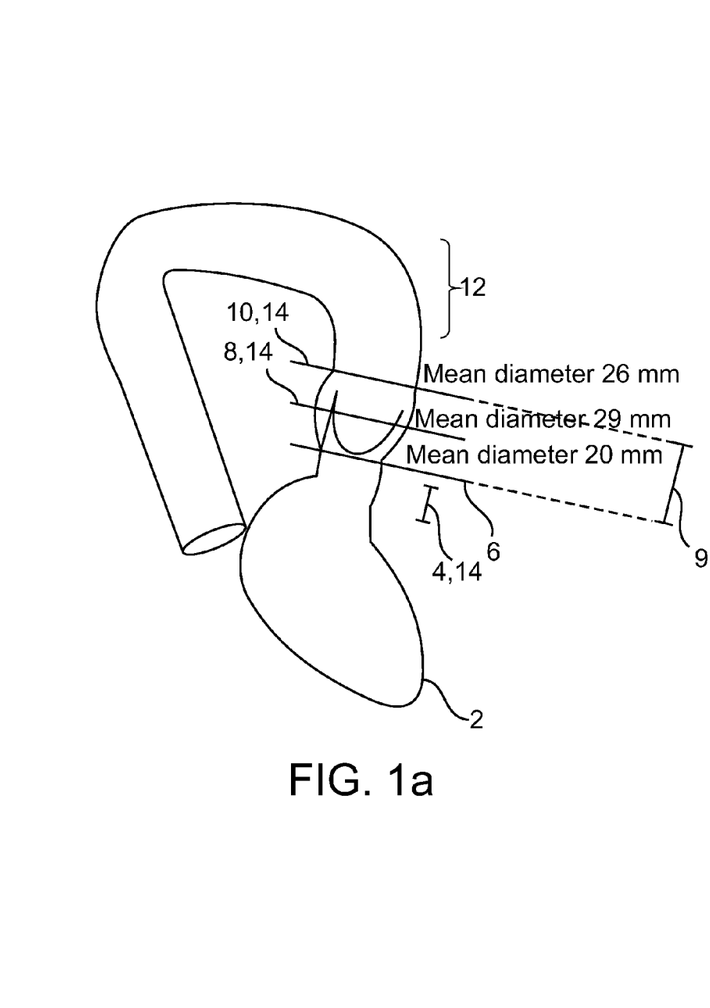
FIG. 1a shows an exemplary three-dimensional representation of a heart including an ascending aorta, an arch of the aorta and a descending aorta.

A three-dimensional object comprising a heart model 2 accompanied by a model of a blood vessel, i.e. an aorta comprising individual sections is depicted. Adjacent to the heart 2 there is arranged the left ventricular outflow tract 4 comprising the aortic valve within the associated aortic valve plane 6.

In the example of FIG. 1a, the mid-sinusal plane 8 within the aortic bulbus 9 as well as the ascending aorta 12 is depicted. Between the aortic bulbus 9 and the ascending aorta 12 the sinutubular junction 10 is arranged. Within the model, different measurement planes 14 are depicted, in FIG. 1 corresponding to a measurement plane 14 associated with the aortic valve plane 6, a measurement plane 14 associated to the mid-sinusal plane 8 and a measurement plane 14 associated with the sinutubular junction 10.

In the example of FIG. 1a, a diameter value, in particular a mean diameter, of 20 mm for the aortic valve plane 6, of 29 mm for the mid-sinusal plane 8 and one with 26 mm for the sinutubular junction 10 is exemplarily given.

Figure 1B:
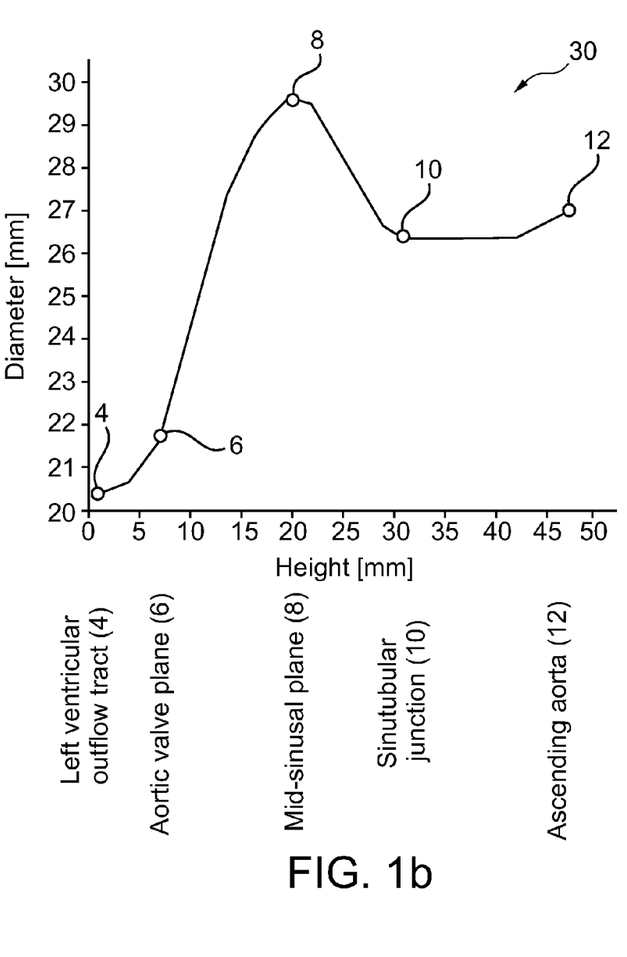
FIG. 1b shows an exemplary embodiment of a diameter profile of FIG. 1 according to the present invention.

Now referring to FIG. 1b, an exemplary embodiment of a diameter profile 30 of FIG. 1a according to the present invention is depicted.

The diameter values given in FIG. 1b correspond in particular to an exemplary mean diameter value of the left ventricular outflow tract 4, the aortic valve plane 6, the mid-sinusal plane 8, the sinutubular junction 10 and the ascending aorta 12. The measurement plane 14 of the aortic valve plane 6 may in particular be corresponding to the actual valve plane within the volumetric medical imaging data, thus precisely matching the respective valve plane with regard to its orientation, so depicting a cross-section of the aortic valve with substantially no geometric distortion. The measurement planes 14 may be depicted, e.g. on a display 78 to medical personnel, which in turn may employ an input 76 for adjusting the measurement plane manually with regard to the aortic valve plane 6, e.g. when employing a system 70 in accordance with FIG. 6.

Within the diagram of FIG. 1b, an according manual input may result in the landmark point 6 being moved in x-direction, along the x-axis or height axis, with the respective y-value, i.e. in FIG. 1b a diameter value, being recalculated due to the re-alignment of the measurement plane 14 by movement of landmark point 6 within the volumetric image information.

Landmark point 8 of the mid-sinusal plane 8 may be determined by the maximum diameter value of the depicted diameter profile 30 while landmark point 10 of the sinutubular junction 10 may be determined by the bending of the curve between the mid-sinusal plane 8 and the ascending aorta 12. Landmark points 4 and 12 may substantially correspond to the first and last measurement of a position along the three-dimensional structure of the object.

Figure 2A:
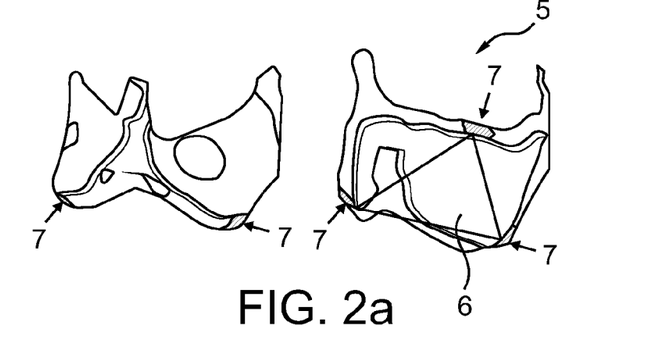
FIG. 2a-c show an exemplary embodiment for detecting a three-dimensional structure of an object comprising individual measurement planes according to the present invention.
Figure 2B:
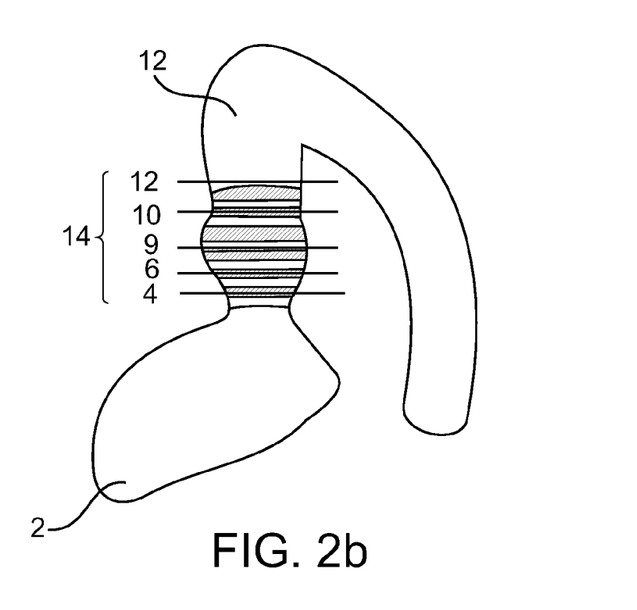
Figure 2C:
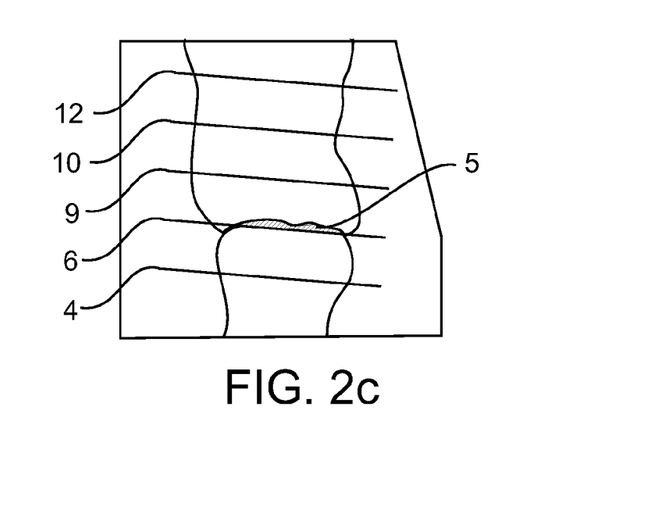

Now referring to FIG. 2a-c, an exemplary embodiment for detecting a three-dimensional structure of an object comprising individual measurement planes according to the present invention is depicted.

For determining the physical properties of the anatomical object, e.g. for planning a minimally invasive procedure and for determining a suitable stent size, a number of measurement planes 14 must be defined. These measurement planes may be derived from the adapted shape model and the information, in particular object context information, encoded therein. The aortic valve plane 6 may defined as the plane that touches all three leaflets or generally landmarks 7 of the aortic valve 5 from beneath, i.e. seen from the direction of the heart 2. To facilitate the determination of the aortic valve plane 6, three landmarks 7 are associated with the mesh on the basal ring of the aortic annulus of the adapted shape model. After segmentation by model adaptation, i.e. varying the generic model to match the patient geometry, the aortic valve plane 6 within the shape model and thus within the three-dimensional structure may be determined from the position of the landmarks 7. To define the measurement planes 14 for measurement of the physical property of the left ventricular outflow tract 4, aortic valve annulus 6, the middle of the aortic bulbus 9, the sinutubular junction 10 and the ascending aorta 12, a plurality of ring-shaped structures are generically encoded on the mesh of the shape model. After model adaptation, associated planes relating to the ring-shaped structures are derived from the respective rings, e.g. by regression analysis. The diameter information may in particular be important for selecting the proper stent, i.e. its size and dimension. To characterize the diameter, the mesh is cut by the respective measurement plane 14. Then, a geometrical structure may be fitted within the object within the respective measurement plane 14 as will be explained below.

Figure 3:
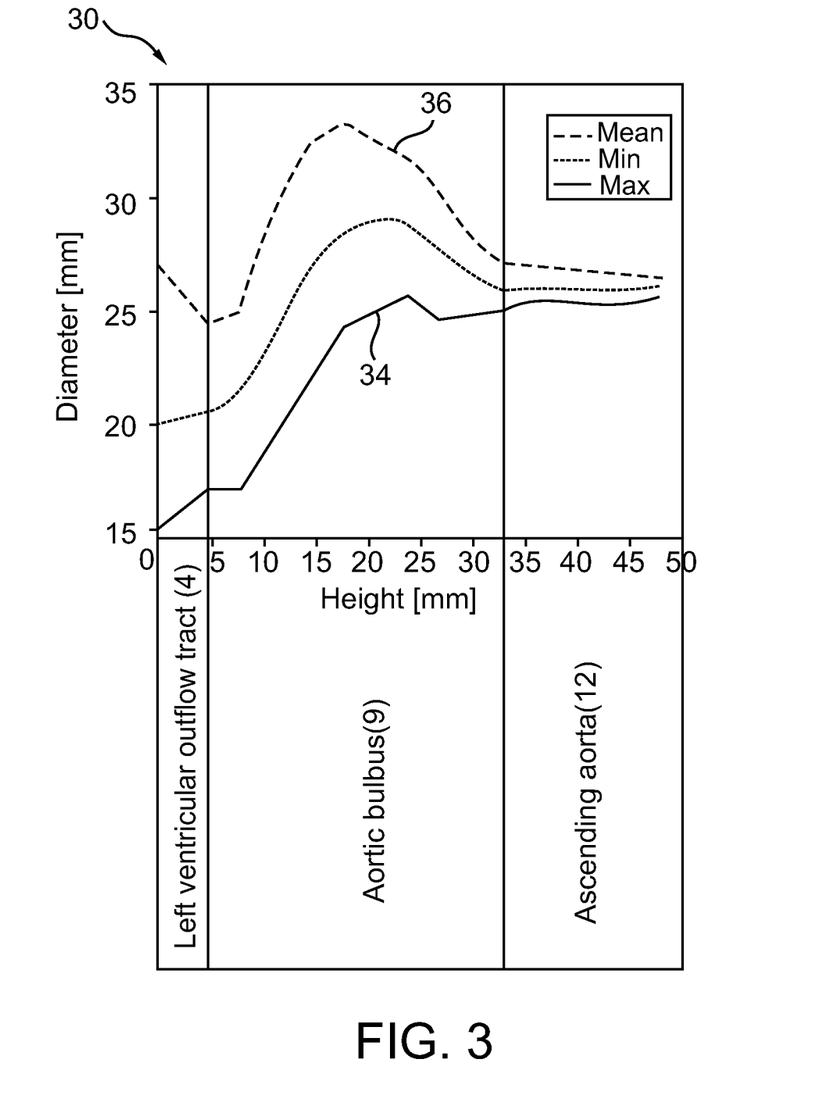
FIG. 3 shows a further exemplary embodiment of a diameter profile according to the present invention.

Now referring to FIG. 3, a further exemplary embodiment of a diameter profile 30 according to the present invention is depicted.

In FIG. 3, not only mean diameter values but also minimum diameter values and maximum diameter values are depicted. The respective diameter values of the diameter properties are determined by employing geometrical shapes for determining a cross-sectional shape corresponding to e.g. an ellipsoid structure having a minimum and a maximum diameter or to two concentric circles having different diameter values, the lesser diameter value being associated with the minimum diameter 34 and the greater diameter value being associated with the maximum diameter value 36. The knowledge of which cross-sectional shape is to be expected may be considered to constitute object context information 38.

Now referring to FIG. 4a-f, individual cross-sectional images of varying segments of the aorta are depicted.

Figure 4A:
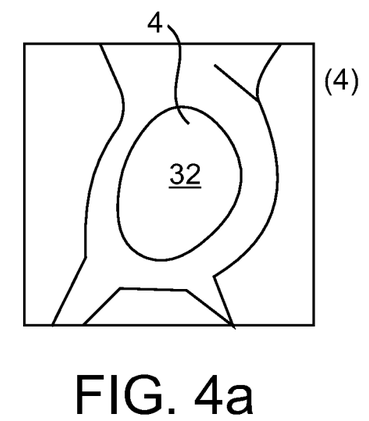
FIG. 4a-f show exemplary embodiment cross-sectional views of an object according to the present invention.
Figure 4B:
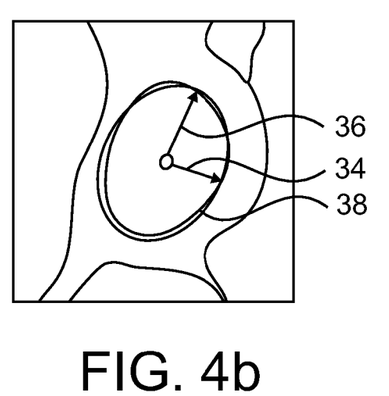

In FIG. 4a, blood vessel/segment of the aorta 32 is depicted within the left ventricular outflow tract 4 having an elliptical cross-sectional shape. In FIG. 4b, a matching employing an ellipsoid structure having a minimum diameter value 34 and a maximum diameter value 36 is depicted. By visually/graphically matching of an according geometrical shape within the measurement planes of FIGS. 4a-4f, the respective diameter values may be determined. Such an automatic matching or fitting may subsequently be manually altered/optimized by medical personnel operating a system 70 according to the present invention.

Figure 4C:
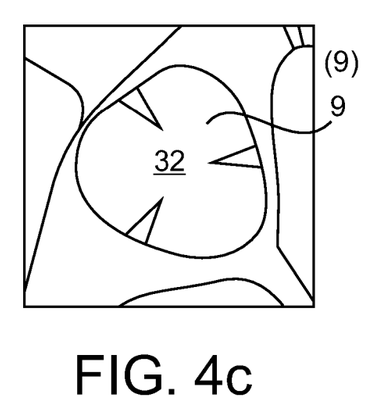
Figure 4D:
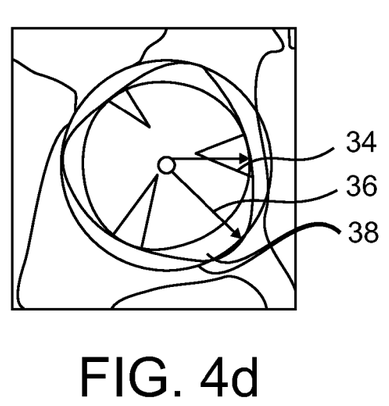
Figure 4E:
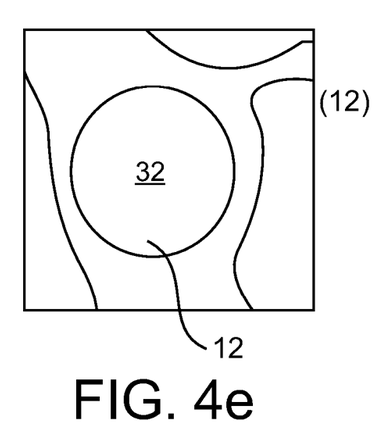

In FIG. 4c, a structure of the aortic bulbus 9 is depicted having a triangular shape. A triangular shape may e.g. be matched by two concentrically aligned circles having a first diameter 34 and a second diameter 36. An according matching is depicted in FIG. 4d.

Figure 4F:
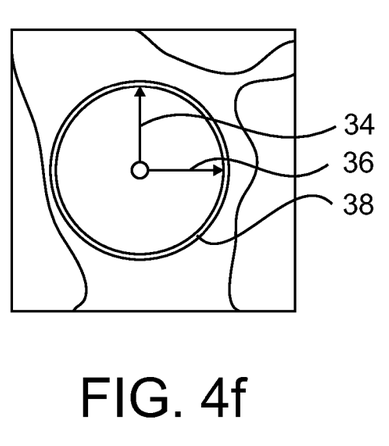

In FIG. 4f, the ascending aorta 12 is depicted having a substantially circular cross-sectional shape. Geometric matching may thus employ a circle or ellipsoid structure, wherein the minimum and maximum diameter values 34, 36 are substantially equal.

With the knowledge of the object context information 38, possibly comprising the type of the anatomical structure, determining or verifying whether the measurement plane 14 is best matched on the respective position on the three-dimensional structure for determining the local physical property may be employed.

E.g. with regard to the ascending aorta 12, since it is known that an ascending aorta 12 substantially comprises a circular cross-sectional shape, a measurement plane 14 may be aligned so that the measurement plane 14 best suits the expected object context information or, in this example, the shape of the anatomical structure, e.g. so that the geometrical shape within the measurement plane 14 matches the expected geometrical shape, i.e. in this example, a circle.

Thus, the measurement plane 14 may be arranged or positioned by employing object context information 38 as well. In other words, determining a position, alignment and/or orientation of a measurement plane 14 may employ object context information 38, e.g. information of a local geometric shape of an anatomical structure.

Figure 5:
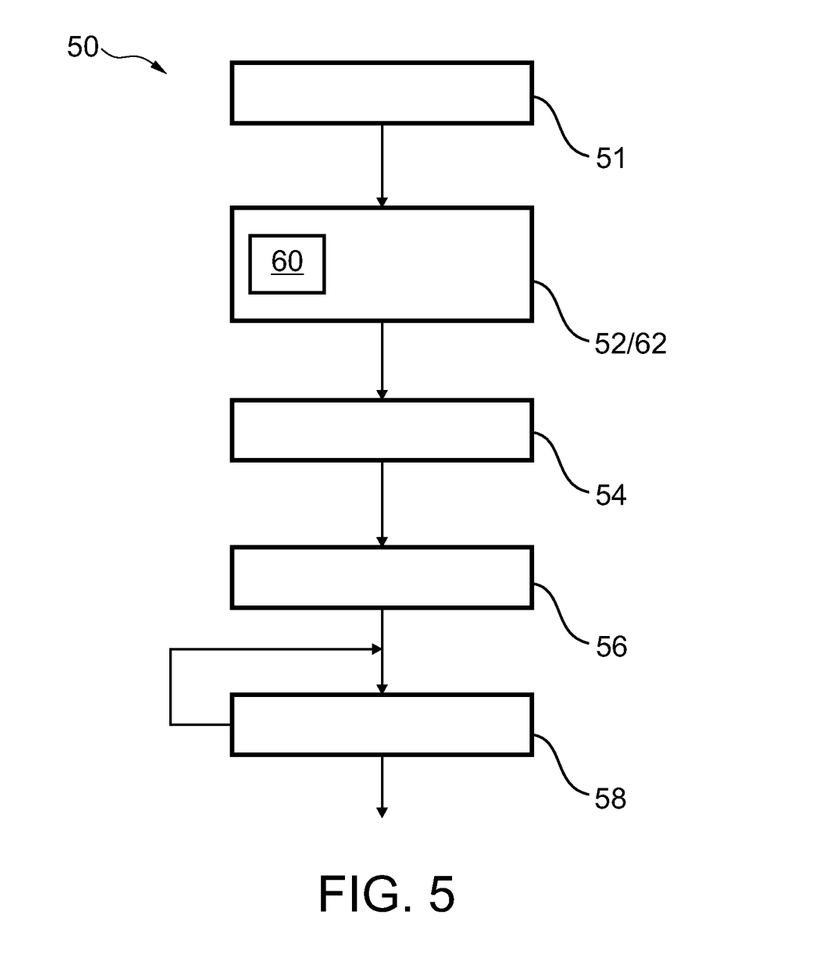
FIG. 5 shows an exemplary embodiment of a method for determining a physical property of an object.

Now referring to FIG. 5, a method 50 for determining a physical property of an object is depicted. The method 50 comprises providing 51 volumetric image information of an object 32 having a three-dimensional structure. Subsequently, a physical property of the object along its three-dimensional structure is determined 52. Furthermore, object context information of the object 32 is determined 54 and the object context information and the physical property are visualized 56. Visualization may comprise displaying both the object context information and the physical property in relation to one another, possibly employing a graph or diagram. One example of an according visualization of a plurality of individual physical property values is a diameter profile 30.

At least a second local physical property may be determined 58 at at least a second position along the three-dimensional structure for establishing the diameter profile 30. The determination of a further local physical property may be repeated until a desired diameter profile 30 is established.

A measurement plane 14 may be determined 60 of the volumetric image information of the object 32, in particular taking into account landmarks or a detected structural element within the three-dimensional structure. Within the measurement plane 14, the local physical property may be determined 62.

Figure 6:
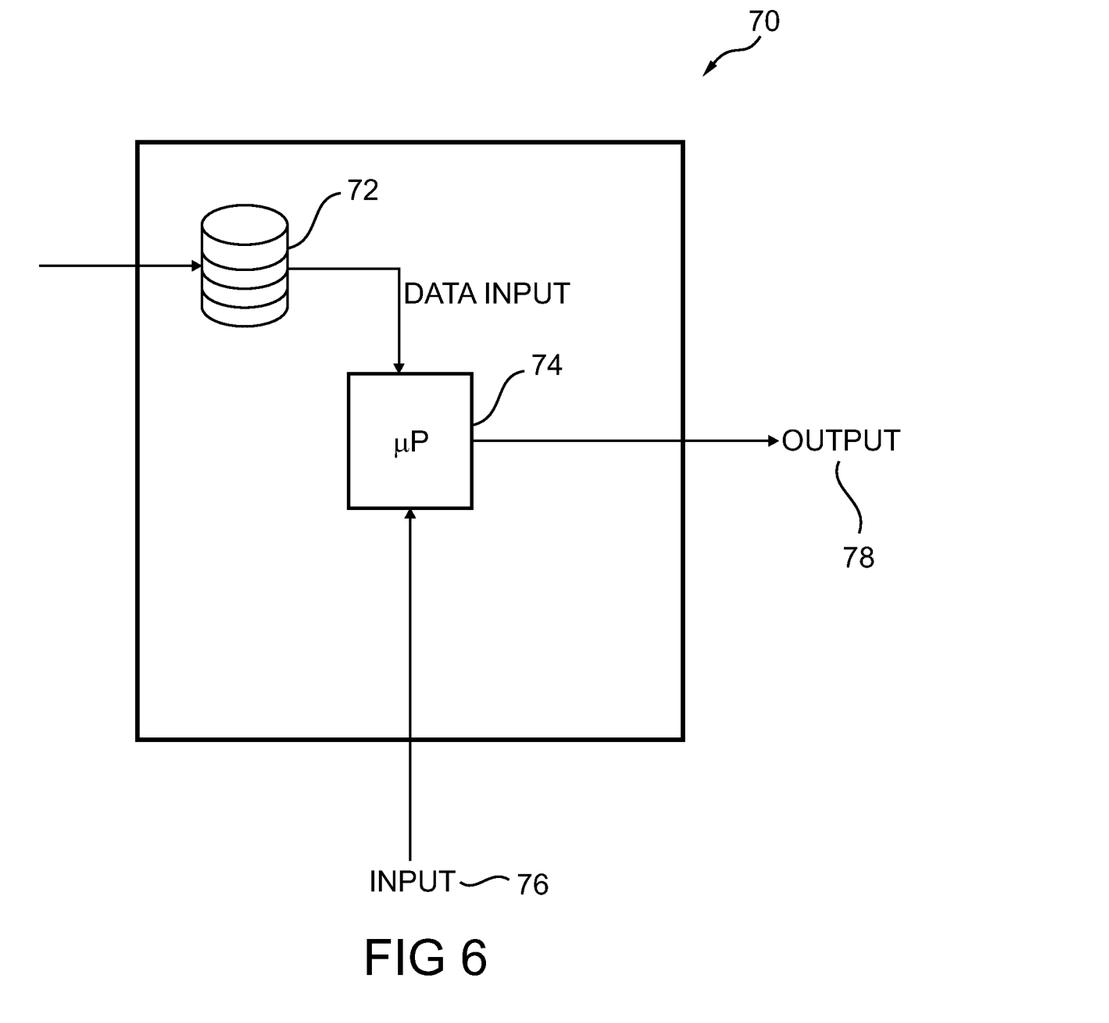
FIG. 6 shows an exemplary embodiment of a system for determining a physical property of an object according to the present invention.

Now referring to FIG. 6, a system 70 for determining a physical property of an object 32 is depicted. Volumetric image information may either be provided by storage element 72 or may be provided directly e.g. from a medical imaging device like a volumetric CT scanner or MRI scanner. The volumetric image information may be stored within storage element 72 and subsequently be provided, via a data input, to processing element 74 or may be provided externally directly to processing element 74.

Processing element 74 carries out the method for determining a physical property of an object 32. An input element 76 is provided for influencing the operation of the method according to the present invention. The result of the determination according to the method of the present invention is output employing output 78, e.g. to a monitor for visual inspection by medical personnel. Input 76 may comprise a computer keyboard, mouse or other manual input devices.

It should be noted that the term "comprising" does not exclude other elements or steps and that the "a" or "an" does not exclude a plurality. Also, elements described in association with different embodiments may be combined.

It should also be noted, that reference numerals in the claims shall not be construed as limiting the scope of the claims.

LIST OF REFERENCE SIGNS

2 Heart
4 Left ventricular outflow tract
5 Aortic valve
6 Aortic valve plane
7 Landmark
8 Mid-sinusal plane
9 Aortic bulbus
10 Sinotubular junction
11 Ascending aorta
12 Measurement plane
14 Diameter profile
32 Object/blood vessel/aorta
34 Minimum diameter
36 Maximum diameter
38 Object context information
50 Method for determining a physical property of an object
51 Step: Providing volumetric image information
52 Step: Determining a physical property 54 Step: Determining object context information
56 Step: Visualization object context information
58 Step: Determining one of at least a second local physical property
60 Step: Determining a measurement plane
62 Step: Determining in the measurement plane the local physical property
70 System for determining a physical property of an object
72 Storage element
74 Processing element
76 Input
78 Output

The invention claimed is:

1. A method for determining a physical property of an object, comprising acts of:
providing to a processor from a storage medium volumetric image information of the object having a three-dimensional structure;
defining by the processor a plurality of segments in a known generic three-dimensional model of the object, wherein each of the plurality of segments comprises local object context information regarding a shape of a cross-section of the object;
determining object context information of the object based on the volumetric image information, wherein the object context information comprises a shape of the object included in the volumetric image information;
adapting the known generic three-dimensional model to form an adapted model that matches the object context information comprising the shape of the object included in the volumetric image information;
defining measurement planes in the plurality of segments of the adapted model, wherein the measurement planes include the local object context information of the object;
determining the local object context information of the object based on the object context information including the shape of the object;
determining the physical property of the object along its three-dimensional structure using the local object context information, wherein the physical property of the object comprises a diameter profile of the object including diameters of the object at different portions of the object along its three-dimensional structure; and
displaying the object context information including the shape of the object and the physical property including the diameter profile.

2. The method according to claim 1, wherein the object comprises an anatomical structure, and wherein the object context information comprises anatomical context information.

3. The method according to claim 2, wherein the anatomical structure is a blood vessel.

4. The method according to claim 2, wherein the anatomical context information comprises at least one of a type of the anatomical structure and a shape of the anatomical structure.

5. The method according to claim 4, wherein the type of the anatomical structure is one of left ventricular outflow tract, aortic valve, aortic bulbus, sinutubular junction and ascending aorta.

6. The method according to claim 4, wherein the shape of the anatomical structure is one of circular shape, elliptical shape, rounded shape and triangle shape.

7. The method according to claim 1, wherein the physical property comprises a local diameter property including a minimum local diameter value and a maximum local diameter value.

8. The method according to claim 2, wherein the act of determining the physical property comprises an act of calculating a diameter property dependent on at least one of a type of the anatomical structure and a shape of the anatomical structure.

9. The method according to claim 1, wherein the act determining the physical property comprises an act of fitting of a geometrical shape dependent on at least one of a shape and a type of the three-dimensional structure within the measurement planes of the volumetric image information of the object.

10. A system for determining a physical property of an object, comprising:
a storage element for providing volumetric image information of an object having a three-dimensional structure;
a processing element t configured to
define a plurality of segments in a known generic three-dimensional model of the object, wherein each of the plurality of segments comprises local object context information regarding a shape of a cross-section of the object,
determine object context information of the object based on the volumetric image information, wherein the object context information comprises a shape of the object included in the volumetric image information,
adapt the known generic three-dimensional model to form an adapted model that matches the object context information comprising the shape of the object included in the volumetric image information,
define measurement planes in the plurality of segments of the adapted model, wherein the measurement planes include the local object context information of the object,
determine the local object context information of the object based on the object context information including the shape of the object, and
determine the physical property of the three-dimensional structure of the object based on the local object context information, wherein the Physical property of the object comprises a diameter profile of the object including diameters of the object at different portions of the object along its three-dimensional structure; and
an output element for displaying the object context information including the shape of the object and the physical property including the diameter profile.

11. A non-transitory computer readable medium comprising computer instructions which, when executed by a processor, configure the processor to perform a method for determining a physical property of an object, the method comprising the acts of:
providing volumetric image information of the object having a three-dimensional structure;
defining a plurality of segments in a known generic three-dimensional model of the object, wherein each of the plurality of segments comprises local object context information regarding a shape of a cross-section of the object;
determining object context information of the object based on the volumetric image information, wherein the object context information comprises a shape of the object included in the volumetric image information;
adapting the known generic three-dimensional model to form an adapted model that matches the object context information comprising the shape of the object included in the volumetric image information;

defining measurement planes in the plurality of segments of the adapted model, wherein the measurement planes include the local object context information of the object;
determining the local object context information of the object based on the object context information including the shape of the object;
determining the physical property of the object along its three-dimensional structure using the local object context information, wherein the physical property of the object comprises a diameter profile of the object including diameters of the object at different portions of the object along its three-dimensional structure; and
displaying the object context information including the shape of the object and the physical property including the diameter profile.

12. The system of claim 10, wherein the physical property comprises a local diameter property including a minimum local diameter value and a maximum local diameter value.

13. The system of claim 10, wherein the act of determining the physical property includes acts of:
fitting a known shape of the cross-section of the object indicated by the local object context information into a portion of the volumetric image information defined by a measurement plane of the measurement planes; and
determining at least one of a maximum and a minimum diameter of the portion of the volumetric image based on the fitted known shape.

14. The non-transitory computer readable medium of claim 11, wherein the physical property comprises a local diameter property including a minimum local diameter value and a maximum local diameter value.

15. The non-transitory computer readable medium of claim 11, wherein the act of determining the physical property includes acts of:
fitting a known shape of the cross-section of the object indicated by the local object context information into a portion of the volumetric image information defined by a measurement plane of the measurement planes; and
determining at least one of a maximum and a minimum diameter of the portion of the volumetric image based on the fitted known shape.

* * * * *